US010783665B2

(12) United States Patent
Eom (10) Patent No.: US 10,783,665 B2
(45) Date of Patent: Sep. 22, 2020

(54) APPARATUS AND METHOD FOR IMAGE PROCESSING ACCORDING TO VEHICLE SPEED (71) Applicant: CAMMSYS CO., LTD., Incheon (KR)

(72) Inventor: Jung Hum Eom, Seongnam (KR)

(73) Assignee: CAMMSYS CO., LTD., Incheon (KR)

( * ) Notice: Subject to any disclaimer, the term of this patent is extended or adjusted under 35 U.S.C. 154(b) by 139 days.

(21) Appl. No.: 16/300,297

(22) PCT Filed: Dec. 30, 2016

(86) PCT No.: PCT/KR2016/015577
§ 371 (c)(1),
(2) Date: Nov. 9, 2018

(87) PCT Pub. No.: WO2017/195965
PCT Pub. Date: Nov. 16, 2017

(65) Prior Publication Data
US 2019/0122387 A1 Apr. 25, 2019

(30) Foreign Application Priority Data
May 11, 2016 (KR) .......................... 10-2016-0057401

(51) Int. Cl.
G06K 9/00 (2006.01)
G06T 7/80 (2017.01)
(Continued)

(52) U.S. Cl.
CPC .................. G06T 7/80 (2017.01); B60R 1/00 (2013.01); B60R 11/04 (2013.01); G06T 5/50 (2013.01);
(Continued)

(58) Field of Classification Search
CPC combination set(s) only.
See application file for complete search history.

(56) References Cited

U.S. PATENT DOCUMENTS

2002/0107621 A1* 8/2002 Byers ..................... B62D 6/002
701/41
2007/0097209 A1* 5/2007 Kubota .............. B62D 15/0275
348/118
2009/0128630 A1* 5/2009 Kanaoka ............ H04N 5/23238
348/148

FOREIGN PATENT DOCUMENTS

JP 2008-507449 A 3/2008
KR 10-2012-0130453 A 12/2012
(Continued)

Primary Examiner — Alex Kok S Liew
(74) Attorney, Agent, or Firm — Patent Office of Dr. Chung Park (57) ABSTRACT The present disclosure provides a device for processing an image based on a vehicle velocity. The device includes: an image receiver configured to receive a raw image obtained from at least one camera installed in the vehicle; a velocity receiver configured to receive a velocity of the vehicle; an image extraction unit configured to extract a partial image corresponding to the received velocity from the raw image; and a display for displaying the extracted partial image. The device provides the driver with an image of the surrounding of the vehicle adapted to the driving situation without installing a driving unit such as a separate motor in the imaging unit. The device also provides different top view images according to the velocities of the vehicle, and provides top view images with less image distortion than conventional top view images.

4 Claims, 7 Drawing Sheets (51) Int. Cl.
*B60R 1/00* (2006.01)
*G06T 7/00* (2017.01)
*B60R 11/04* (2006.01)
*G06T 5/50* (2006.01)

(52) U.S. Cl.
CPC .......... *G06T 7/97* (2017.01); *B60R 2300/105* (2013.01); *B60R 2300/303* (2013.01); *B60R 2300/70* (2013.01); *B60R 2300/806* (2013.01); *G06T 2207/30236* (2013.01)

(56) References Cited

FOREIGN PATENT DOCUMENTS

| | | |
|---|---|---|
| KR | 10-1239740 B1 | 3/2013 |
| KR | 10-1278654 B1 | 6/2013 |
| KR | 10-1376210 B1 | 3/2014 |

\* cited by examiner

parking phase top view image

[FIG. 8]

low-speed phase range top view image

[FIG. 9]

high-speed phase range top view image

[FIG. 10]

APPARATUS AND METHOD FOR IMAGE PROCESSING ACCORDING TO VEHICLE SPEED

TECHNICAL FIELD

Embodiments of the present disclosure relate to a device and method for processing an image based on vehicle velocity, and, more particularly, to a device and method for processing an image based on vehicle velocity by which a surrounding image to be adapted to a driving situation of a vehicle is provided to a driver.

BACKGROUND

AVM (Around View Monitor) system images a surrounding environment using cameras installed on the front, rear, left, and right sides of the vehicle. The system then corrects the image so that an overlapping region appears natural. Then, the system displays the surrounding environment of the vehicle in a top view form on the screen. Accordingly, the driver can recognize the displayed surrounding environment, accurately recognize the surrounding situation of the vehicle and conveniently park the vehicle without having to look at the side mirrors or the back mirrors.

Figure 1:
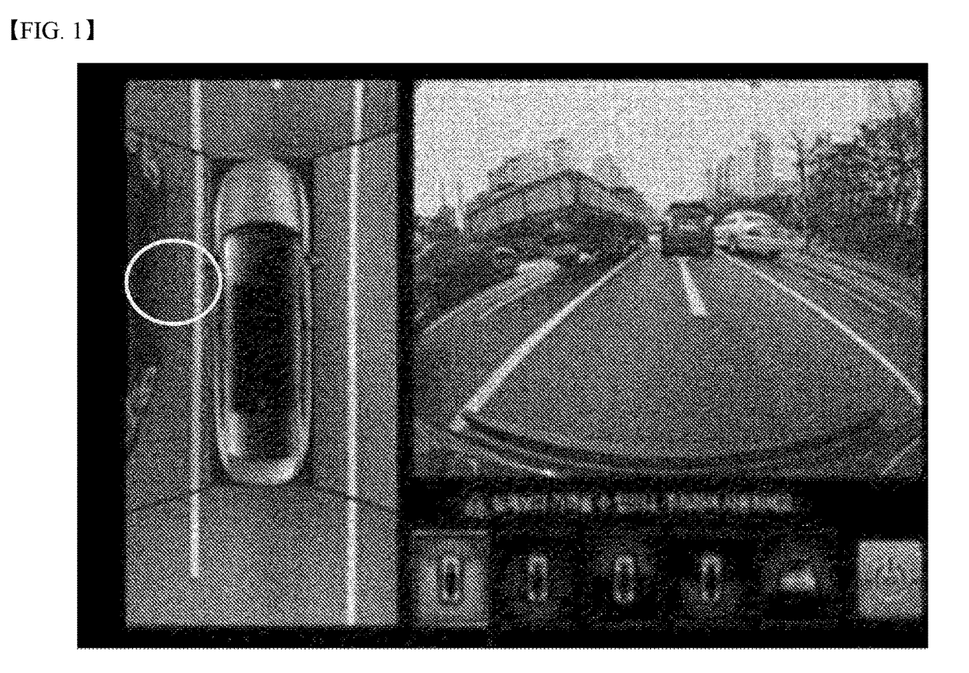
FIG. 1 shows an example of a conventional top view image.

However, the AVM image uses a fixed wide-angle camera to generate a plurality of imaged images as a top view image. Therefore, image distortion occurs. At a high speed of the vehicle, the distances from a front vehicle and a rear vehicle and locations thereof are not clear to the driver. Further, the left/right image shows only 5% to 10% of a left or right vehicle, as can be seen in FIG. 1. The left and right images are distorted such that there is a problem that the vehicle appears larger. Furthermore, it is not easy for the driver to know the distance from the left or right vehicle, such that an accident threat occurs.

The problem associated with the AVM image occurs because the AVM system uses the fixed image obtained from the fixed wide-angle camera and thus displays the same top view image at the time of parking or at a high speed driving.

DISCLOSURE

Technical Purpose

In order to solve the problems of the prior art as described above, the present disclosure is to provide a device and method for processing an image based on vehicle velocity by which a surrounding image to be adapted to a driving situation of a vehicle is provided to a driver.

Other objectives of the present disclosure may be derived by those skilled in the art from the following examples.

Technical Solution

In a first aspect of the present disclosure, there is provided a device for processing an image based on a vehicle velocity, the device comprising: an image receiver configured to receive a raw image obtained from at least one camera installed in the vehicle; a velocity receiver configured to receive a velocity of the vehicle; an image extraction unit configured to extract a partial image corresponding to the received velocity from the raw image; and a display for displaying the extracted partial image.

In one embodiment of the first aspect, the velocity range is divided into a parking phase range, a low-speed phase range, and a high-speed phase range, wherein the image extraction unit is configured to: extract a partial image corresponding to a short-distant scene from the vehicle from the raw image in the parking phase range; extract a partial image corresponding to a middle-distant scene from the vehicle from the raw image in the low-speed phase range; and extract a partial image corresponding to a long-distant scene from the vehicle from the raw image in the high-speed phase range.

In one embodiment of the first aspect, a resolution of the raw image is N×M where N is a number of horizontal pixels, and M is a number of vertical pixels, wherein a resolution of the partial image extracted by the image extraction unit is adjusted into N×Z where Z is a value smaller than M.

In a second aspect of the present disclosure, there is provided a device for processing an image based on a vehicle velocity, the device comprising: an image receiver configured for receiving a plurality of raw images obtained from a plurality of imaging units installed in a vehicle; a velocity receiver configured for receiving a velocity of the vehicle; an image extraction unit configured for extracting a partial image corresponding to the received velocity from each of the plurality of raw images; a top view image generation unit configured for converting the plurality of extracted partial images into a single top view image; and a display for displaying the top view image.

In one embodiment of the second aspect, the velocity range is divided into a parking phase range, a low-speed phase range, and a high-speed phase range, wherein the image extraction unit is configured to: extract a partial image corresponding to a short-distant scene from the vehicle from each of the plurality of the raw images in the parking phase range; extract a partial image corresponding to a middle-distant scene from the vehicle from each of the plurality of the raw images in the low-speed phase range; and extract a partial image corresponding to a long-distant scene from the vehicle from each of the plurality of the raw images in the high-speed phase range.

In one embodiment of the second aspect, the device further comprises a lookup table storage, wherein the lookup table storage stores therein: a first lookup table including mapping data indicating a correspondence relationship between the plurality of partial images extracted in the parking phase range and corresponding top view images; a second lookup table including mapping data indicating a correspondence relationship between the plurality of partial images extracted in the low-speed phase range and corresponding top view images; and a third lookup table including mapping data indicating a correspondence relationship between the plurality of partial images extracted in the high-speed phase range and corresponding top view images, wherein the top view image generation unit is further configured to generate at least one of a first top view image in the parking phase range, a second top view image in the low-speed phase range, and a third top view image in the high-speed phase range, using at least one of the first to third lookup tables corresponding to the parking phase range, the low-speed phase range, and the high-speed phase range.

In one embodiment of the second aspect, the device further comprises: an event detection unit configured for detecting an event occurrence when a predefined object is detected from the top view images or a motion in a surrounding of the vehicle is detected by a sensor; and a controller configured for switching a display of a top view image between the first to third top view images when the event detection unit detects the event occurrence, wherein when a predefined object is detected from the first top view image or the second top view image or a movement in the surrounding of the vehicle is sensed by the sensor while the velocity is in a high-speed phase range, the controller switches the third top view image being displayed in the display to the first top view image or the second top view image, wherein when a predefined object is detected from the first top view image or a movement in the surrounding of the vehicle is sensed by the sensor while the velocity is in a low-speed phase range, the controller switches the second top view image being displayed in the display to the first top view image.

In a third aspect of the present disclosure, there is provided a method for processing an image based on a vehicle velocity, the method comprising: receiving a plurality of raw images obtained from a plurality of imaging units installed in a vehicle; receiving a velocity of the vehicle; extracting a partial image corresponding to the received velocity from each of the plurality of raw images; converting the plurality of extracted partial images into a single top view image; and displaying the top view image.

In one embodiment of the third aspect, the velocity range is divided into a parking phase range, a low-speed phase range, and a high-speed phase range, wherein extracting the partial image corresponding to the received velocity from each of the plurality of raw images includes: extracting a partial image corresponding to a short-distant scene from the vehicle from each of the plurality of the raw images in the parking phase range; extracting a partial image corresponding to a middle-distant scene from the vehicle from each of the plurality of the raw images in the low-speed phase range; and extracting a partial image corresponding to a long-distant scene from the vehicle from each of the plurality of the raw images in the high-speed phase range.

In one embodiment of the third aspect, converting the plurality of extracted partial images into the single top view image includes: generating a first top view image in the parking phase range using a first lookup table, wherein the first lookup table includes mapping data indicating a correspondence relationship between the plurality of partial images extracted in the parking phase range and corresponding top view images; generating a second top view image in the low-speed phase range using a second lookup table, wherein the second lookup table includes mapping data indicating a correspondence relationship between the plurality of partial images extracted in the low-speed phase range and corresponding top view images; and/or generating a third top view image in the high-speed phase range using a third lookup table, wherein the third lookup table includes mapping data indicating a correspondence relationship between the plurality of partial images extracted in the high-speed phase range and corresponding top view images.

In one embodiment of the third aspect, the method further comprises: detecting an event occurrence when a predefined object is detected from the top view images or a motion in a surrounding of the vehicle is detected by a sensor; when a predefined object is detected from the first top view image or the second top view image or a movement in the surrounding of the vehicle is sensed by the sensor while the velocity is in the high-speed phase range, switching the third top view image being displayed in the display to the first top view image or the second top view image; and/or when a predefined object is detected from the first top view image or a movement in the surrounding of the vehicle is sensed by the sensor while the velocity is in the low-speed phase range, switching the second top view image being displayed in the display to the first top view image.

Technical Effect

According to the present disclosure, the device extracts and displays different images according to the velocities of the vehicle. Thus, there is an advantage in that it is possible to provide the driver with an image of the surrounding of the vehicle adapted to the driving situation without installing a driving unit such as a separate motor in the imaging unit.

According to the present disclosure, it is possible to provide different top view images according to the velocities of the vehicle, and to provide top view images with less image distortion than conventional top view images.

BEST MODE FOR CARRYING OUT INVENTION

According to a preferred embodiment of the present disclosure to achieve the above object, there is provided a device for processing an image based on a vehicle velocity, the device comprising: an image receiver configured to receive a raw image obtained from at least one camera installed in the vehicle; a velocity receiver configured to receive a velocity of the vehicle; an image extraction unit configured to extract an image from the raw image based on the velocity, where the extracted image includes different regions in the raw image based on the velocity; and a display for displaying the extracted image.

MODE FOR CARRYING OUT INVENTION

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims. It will be understood that when an element or layer is referred to as being "connected to", or "coupled to" another element or layer, it can be directly on, connected to, or coupled to the other element or layer, or one or more intervening elements or layers may be present. In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

For simplicity and clarity of illustration, elements in the figures are not necessarily drawn to scale. The same reference numbers in different figures denote the same or similar elements, and as such perform similar functionality.

Hereinafter, the present disclosure will be described with reference to the accompanying drawings.

Figure 2:
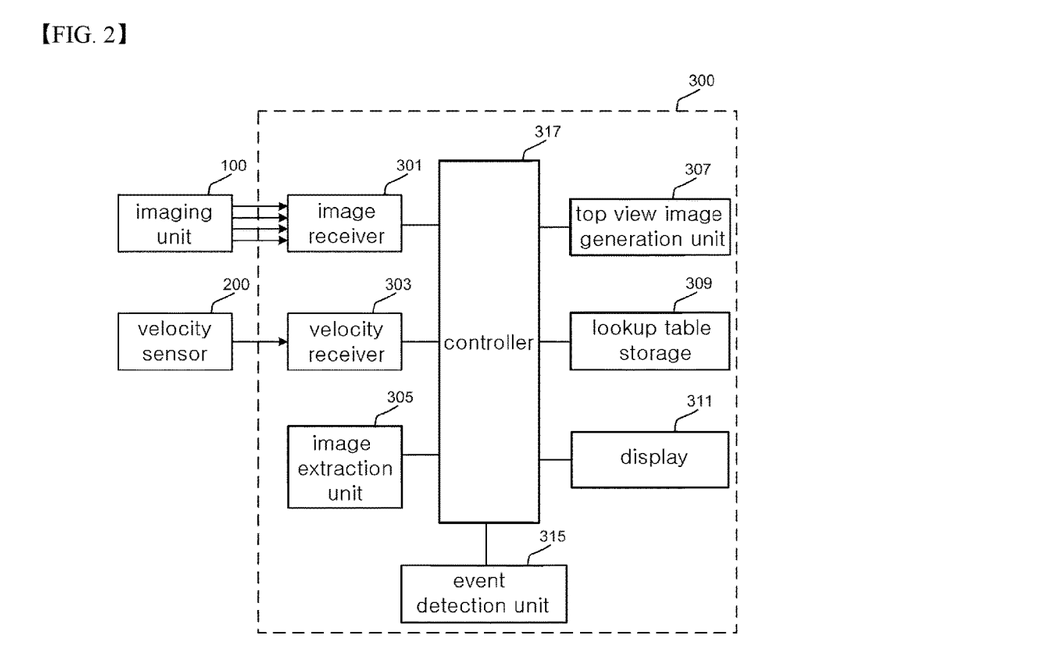
FIG. 2 is a block diagram illustrating one example of a system for processing an image based on a vehicle velocity according to one embodiment of the present disclosure.

FIG. 2 is a block diagram illustrating one example of a system for processing an image based on a vehicle velocity according to one embodiment of the present disclosure.

Referring to FIG. 2, a system for processing an image may include an imaging unit 100, a velocity sensor 200, and a device 300 for processing an image.

The imaging unit 100 may include a camera. The imaging unit 10 is installed at each of the front and rear left and right portions of the vehicle, and images a raw image of a surrounding of the vehicle, and converts the imaged image into an electrical signal, and transmits the electrical signal to the image receiver 301.

At least one imaging unit 10 is installed in the vehicle to image the surrounding raw image of the vehicle. In one example, the imaging unit 10 may be implemented as a wide angle camera including a fish eye lens. The wide angle camera may be a simple optical device and may include an electrical unit such as an image sensor or the like that converts an optical signal to an electrical signal. For example, the wide angle camera may be disposed at each of the front/rear/left/right sides of the vehicle. The imaging units may be arranged such that regions imaged by adjacent imaging units overlap at least partially.

The velocity sensor 200 measures the velocity of the vehicle and transmits the measured velocity to the device for processing the image.

The velocity sensor 200 may be implemented as a variety of sensors for measuring the velocity of the vehicle.

The device 300 for processing an image may include an image receiver 301, a velocity receiver 303, an image extraction unit 305, a top view image generation unit 307, a lookup table storage 309, a display 311, and an event detection unit 315.

The image receiver 301 may be means for receiving a raw image obtained from at least one imaging unit 100. If necessary, the image receiver 301 may perform an image pre-processing using a filter or the like.

The velocity receiver 303 receives the velocity of the vehicle measured by the velocity sensor.

The image extraction unit 305 extracts images including different regions from the raw image based on the velocity received by the velocity receiver 303.

More specifically, the velocity range may be divided into a parking phase range (20 km or less), a low-speed phase range (20 to 80 km), and a high-speed phase range (80 km or more). The image extraction unit 305 extracts a partial image corresponding to a short-distant scene from the vehicle from the raw image in the parking phase range, extracts a partial image corresponding to a middle-distant scene from the vehicle from the raw image in the low-speed phase range, and extracts a partial image corresponding to a long-distant scene from the vehicle from the raw image in the high-speed phase range.

Although the velocity range is divided into three phase ranges including the parking phase range, low-speed phase range, and high-speed phase range, this division is for convenience of illustration of the present disclosure. The present disclosure is not limited thereto. The velocity range may be divided into more velocity phase ranges. Further, the image extraction unit 305 is configured to extract, based on the speed range, from the raw image, a partial image corresponding to the short-distant scene from the vehicle in the low speed range and a partial image corresponding to the long-distant scene from the vehicle in the high speed range.

Figure 3:
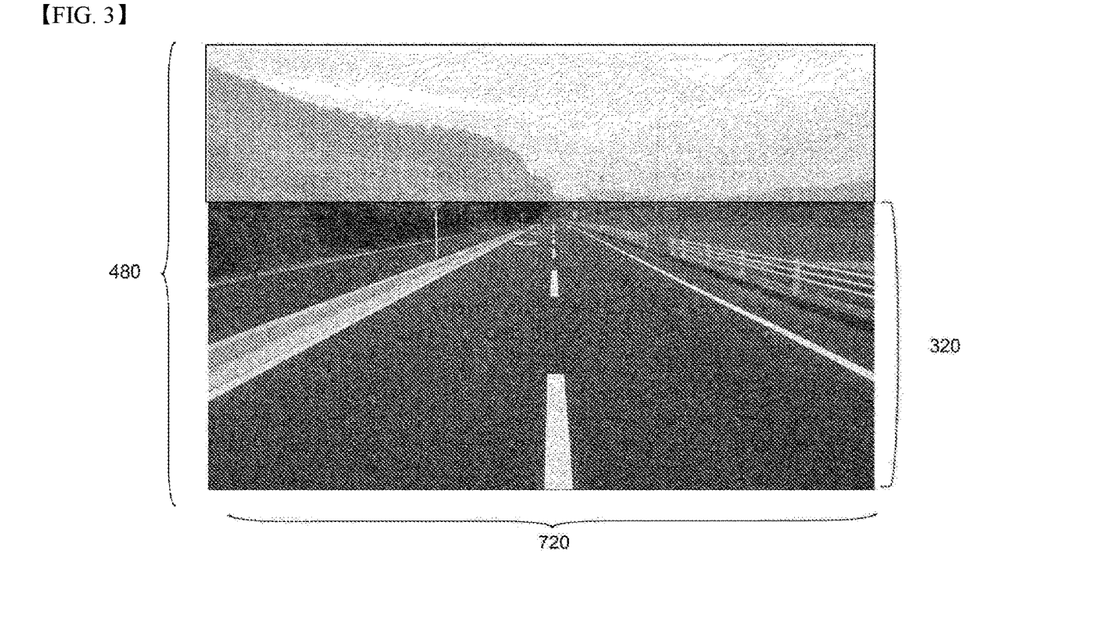
FIG. 3 to FIG. 5 illustrate an example of an image extraction unit for extracting a target image from a raw image acquired from a camera installed at a front portion of a vehicle.
Figure 4:
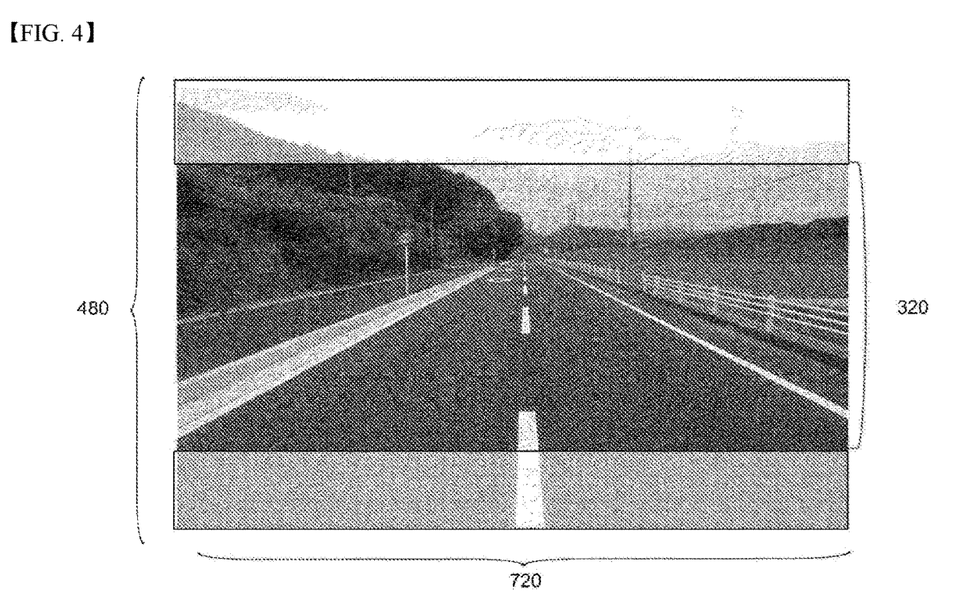
Figure 5:
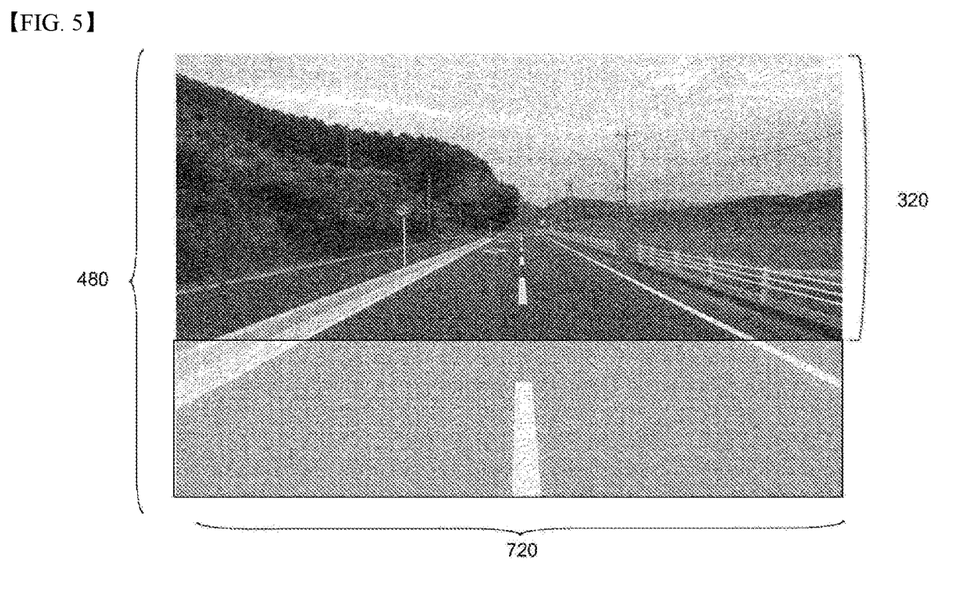

FIGS. 3 to 5 illustrate one example of how an image extraction unit extracts an image from a raw image acquired by an imaging unit installed in the front portion of the vehicle.

The extracted image in FIG. 3 is one example of the image displayed on the display 311 in the parking phase range. A partial image is clipped from the raw image imaged at a resolution 720×480. Thus, a partial image corresponding to the short-distant scene from the vehicle is extracted at resolution 720×420. In the parking phase range, the driver of the vehicle must look carefully at the short-distant scene rather than the long-distant scene. The image extraction unit 305 according to the present disclosure extracts only the partial image corresponding to the short-distant scene from the vehicle from the raw image and displays the same on the display 311.

The extracted image in FIG. 4 is one example of the image displayed on the display 311 at the low-speed phase range. The partial image corresponding to the middle-distant scene from the vehicle is extracted from the raw image imaged at a resolution 720×480. At the low-speed phase such as the driving in the city, the driver of the vehicle must look carefully at the middle-distant scene rather than the short-distant scene from the vehicle. Thus, the image extraction unit 305 according to the present disclosure extracts only the partial image corresponding to the middle-distant scene from the vehicle from the raw image and displays the same on the display 311.

The extracted image of FIG. 5 is one example of the image displayed on the display 311 in the high-speed phase range. The partial image corresponding to the long-distant scene from the vehicle is extracted from the raw image imaged at a resolution 720×480. In the high-speed phase range, the driver of the vehicle must observe the long-distant scene rather than the short-distant scene from the vehicle. Thus, the image extraction unit 305 in accordance with the present disclosure extracts only the partial image corresponding to the long-distant scene from the vehicle from the raw image and displays the same on the display 311.

Conventionally, in a parking mode of a vehicle, a motor allows a rear view mirror to rotate downward to show a close-up scene from the vehicle to a driver. Alternatively, the imaging unit or camera with the motor was rotated to face the close-up scene from the vehicle.

However, according to the present disclosure, different regions are extracted and displayed from the raw image based on the parking phase range, the low-speed phase range, and the high-speed phase range. Accordingly, there is an advantage that the image of the surrounding of the vehicle adapted to the driving situation can be provided to the driver without installing a driving unit such as a separate motor in the imaging unit.

FIGS. 3 to 5 illustrate the case where the region extracted from a raw image imaged by the vehicle's front imaging unit is displayed. However, this disclosure is not limited to this. A raw image obtained by the vehicle's rear imaging unit may be extracted and displayed in the same manner as described above.

Hereinafter, a method for processing an image will be described as an example in which image correction processing is performed based on images obtained via the imaging units provided on the front side, the rear side, the left side, and the right side of the vehicle, respectively so that an overlapping region appears natural. This allows the top view image of the surrounding environment of the vehicle to be displayed differently based on the velocity of the vehicle.

Figure 6:
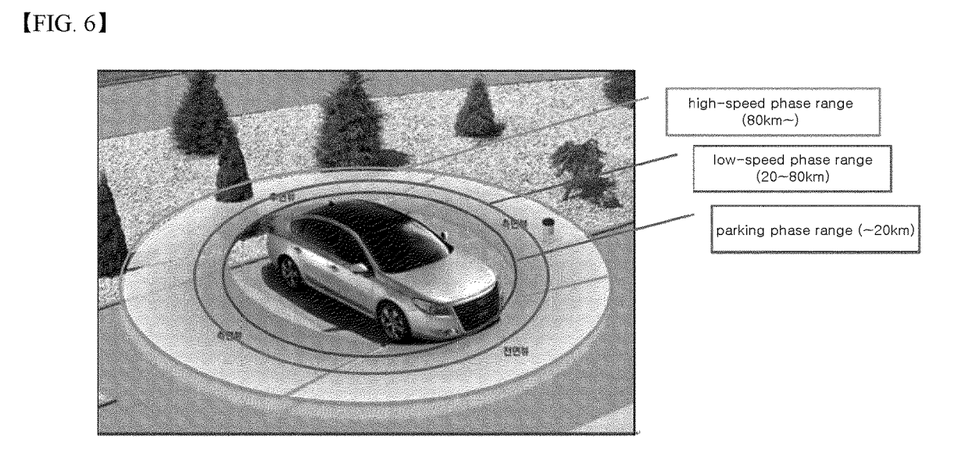
FIG. 6 shows an example of a top view image provided according to one embodiment of the present disclosure.

A top view image provided by the conventional AVM system displays the same image at the time of parking and at traveling at a high speed. Thus, the top view image suitable for the driving situation of the driver's vehicle could not be provided. However, according to the present disclosure, different top view images are provided based on the parking phase range, the low-speed phase range, and the high-speed phase range, as shown in FIG. 6. Thus, a top view image suitable for the driver's vehicle driving situation is provided.

Illustrating the present approach with referring again to FIG. 2, the top view image generation unit 307 converts a plurality of images extracted by the image extraction unit 305 into a top view image using a lookup table LUT.

The lookup table storage 309 stores a first lookup table storing mapping data indicating a correspondence relationship between a plurality of images extracted in a parking phase range and corresponding top view images, a second lookup table storing mapping data indicating a correspondence relationship between a plurality of images extracted in the low-speed phase range and corresponding top view images, and a third lookup table storing mapping data indicating a correspondence relationship between a plurality of images extracted in the high-speed phase range and corresponding top view images. That is, the images extracted by the image extraction unit 305 are different based on the parking phase range, the low-speed phase range, and the high-speed phase range based on the velocity of the vehicle. Thus, the lookup table storage 309 may create and store different lookup tables according to different phase ranges.

Figure 7:
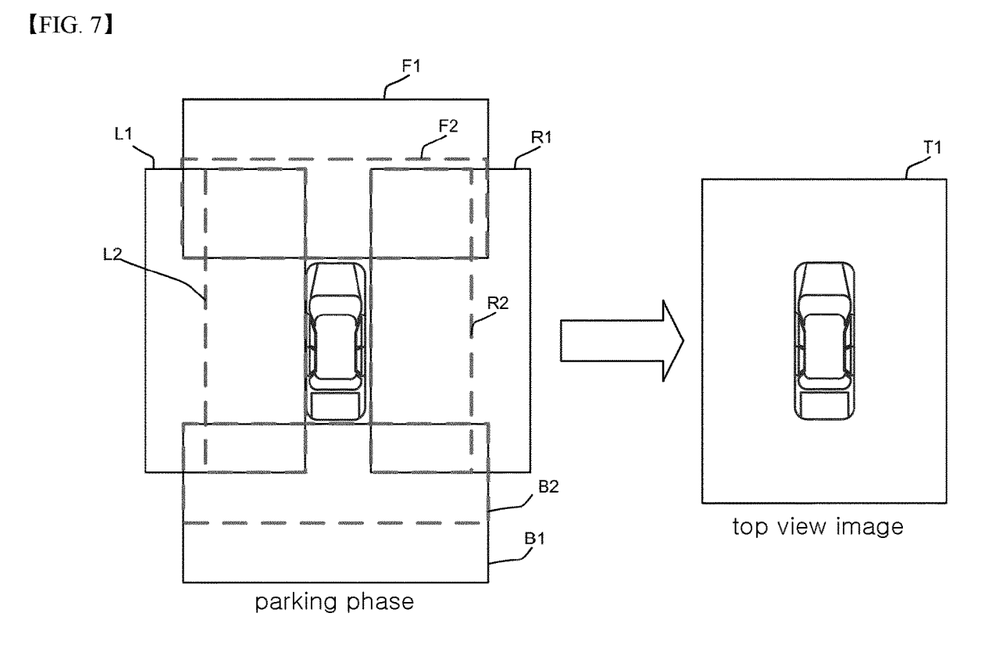
FIGS. 7 to 9 show one example of a top view image generated based on a travel velocity, according to one embodiment of the present disclosure.
Figure 8:
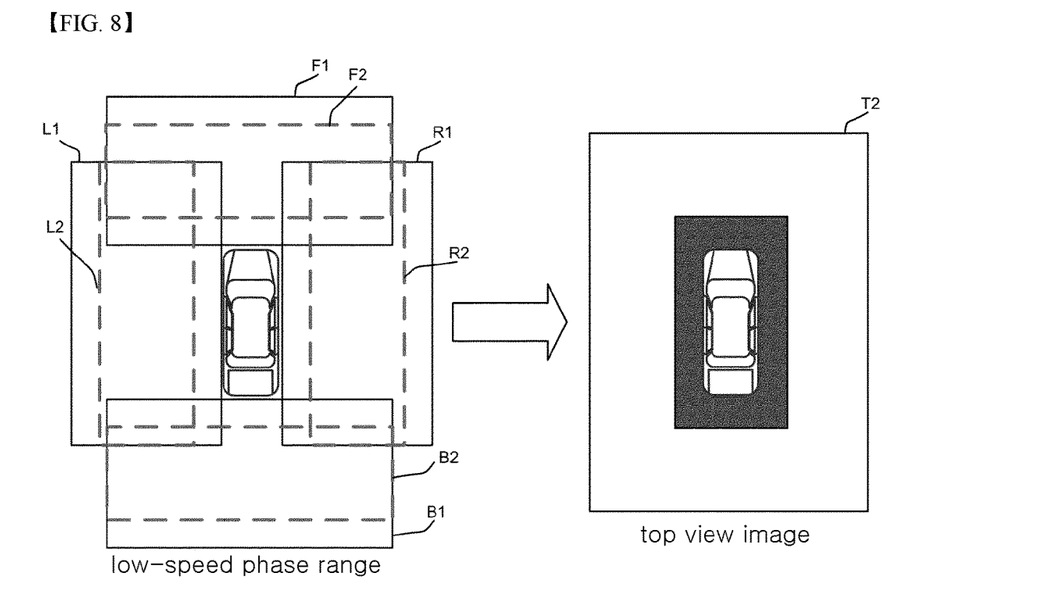
Figure 9:
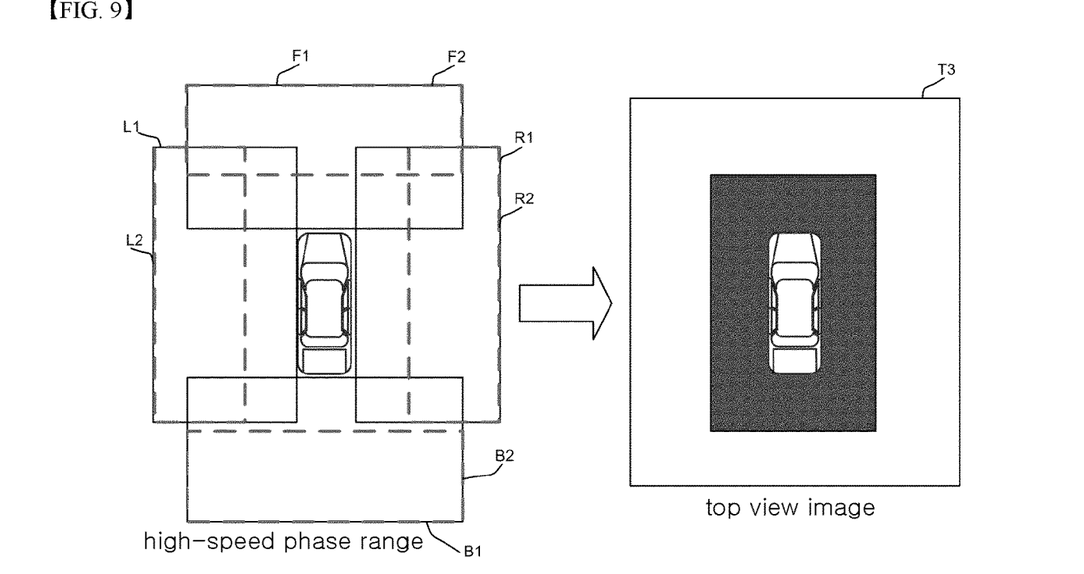

FIGS. 7 to 9 show examples of different top view images generated according to different velocity phase ranges according to one embodiment of the present disclosure.

FIG. 7 is one example of the top view image in the parking phase range. FIG. 8 is one example of the top view image in the low-speed phase range. FIG. 9 is one example of a top view image in the high-speed phase range. F1 is a front raw image from the vehicle, L1 is a left raw image from the vehicle, R1 is a right raw image from the vehicle, and B1 is a rear raw image from the vehicle. Further, F2 is an image extracted from the front raw image, L2 is an image extracted from the left raw image, R2 is an image extracted from the right raw image, and B2 is an image extracted from the rear raw image.

Figure 10:
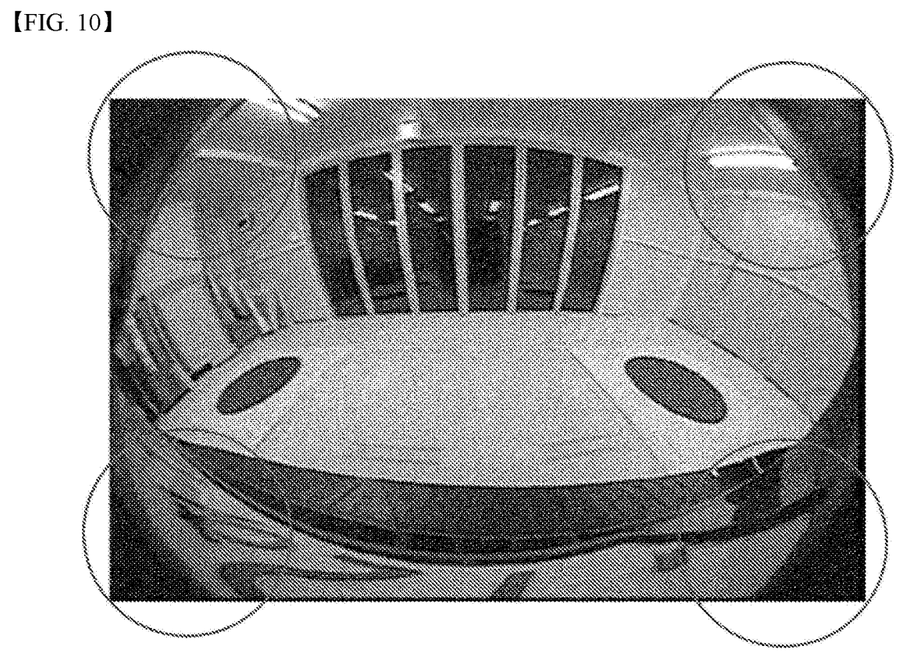
FIG. 10 shows one example of a raw image acquired by the wide-angle camera.

As shown in FIG. 7, when the velocity of the vehicle is in the parking phase range, the image extraction unit 305 extracts images F2, L2, R2, and B2 corresponding to the short-distant scenes from the vehicle respectively from the raw images F1, L1, R1 and B1 obtained from the imaging units. The top view image generation unit 307 generates a first top view image T1 using the first lookup table and the extracted images F2, L2, R2, and B2. Since the first top view image is generated using the regions corresponding to the short-distant scenes extracted from the raw images, the first top view image has less image distortion of the vehicle surrounding than the top view image generated using the raw images. More specifically, when a wide-angle imaging unit or camera is used, imaging distortion occurs. Via the internal parameters correction or calibration of the imaging unit, the distorted image is corrected. Due to the characteristics of the wide-angle imaging unit, the image distortion at the corners becomes severe in the raw images as shown in FIG. 10. However, according to the present disclosure, since a top view image is generated using the images extracted from the raw images such that the image of the edge region with severe image distortion is removed. There is an advantage that a top view image having less image distortion can be generated as compared with a conventional top view image generated using the raw images.

Referring to FIG. 8, when the velocity of the vehicle is in the low-speed phase range, the image extraction unit 305 extracts images F2, L2, R2 and B2 corresponding to the middle-distant scenes from the vehicle respectively from the raw images F1, L1, R1 and B1 obtained from the imaging units. The top view image generating unit 307 generates the second top view image T2 using the extracted images F2, L2, R2 and B2 and the second lookup table. Since the second top view image is generated using the images corresponding to the middle-distant scenes with a small image distortion rather the raw images, the second top view image has less image distortion of the surrounding of the vehicle than the top view image generated using the raw image. In this regard, in the second top view image T2, the region close to the vehicle may be displayed in a gray color.

Referring to FIG. 9, when the velocity of the vehicle is in the high-speed phase range, the image extraction unit 305 extracts images F2, L2, R2 and B2 corresponding to the long-distant scenes from the vehicle respectively from the raw images F1, L1, R1 and B1 obtained from the imaging units. The top view image generating unit 307 generates the third top view image T3 using the extracted images F2, L2, R2 and B2 and the third lookup table. Since the third top view image is generated using the images corresponding to the long-distant scenes with a small image distortion rather the raw images, the third top view image has less image distortion of the surrounding of the vehicle than the top view image generated using the raw image. In this regard, in the third top view image T3, the region close to the vehicle may be displayed in a gray color.

That is, in the present disclosure, providing different top view images according to the phases based on the velocity of the vehicle may allow the surrounding image to be adapted to the vehicle's driving situation of the driver.

Referring again to FIG. 2, when a predefined object is detected from the top view image or motion information is detected by a sensor that detects the surrounding motion of the vehicle, the event detection unit 315 determines this situation as an event occurrence.

In one example, while the velocity of the vehicle is the high-speed phase range, the event detection unit 315 detects a predefined object from the first top view image T1 and the second top view image T2 or an event related to the first top view image T1 and the second top view image T2 is detected by the sensor. In this response, the controller 317 may switch the third top view image T3 at the high-speed phase range displayed on the display 311 to the first top view image T1 or the second top view image T2.

That is, when it is detected that a vehicle surrounding related event occurs during a vehicle traveling at a high speed, the first top view image T1 or second top view image T2, which may show an image of the vehicle surroundings in more detailed manner as compared to the third top view image T3 is provided to the driver. This allows the driver to quickly respond to events occurring in the vehicle surroundings.

Further, while the velocity of the vehicle is a low-speed phase range, the event detection unit 315 detects a predefined object from the first top view image T1 or a motion event is detected by the sensor. In this response, the controller 317 may automatically switch the second top view image T2 displayed in the display to the first top view image T1.

Figure 11:
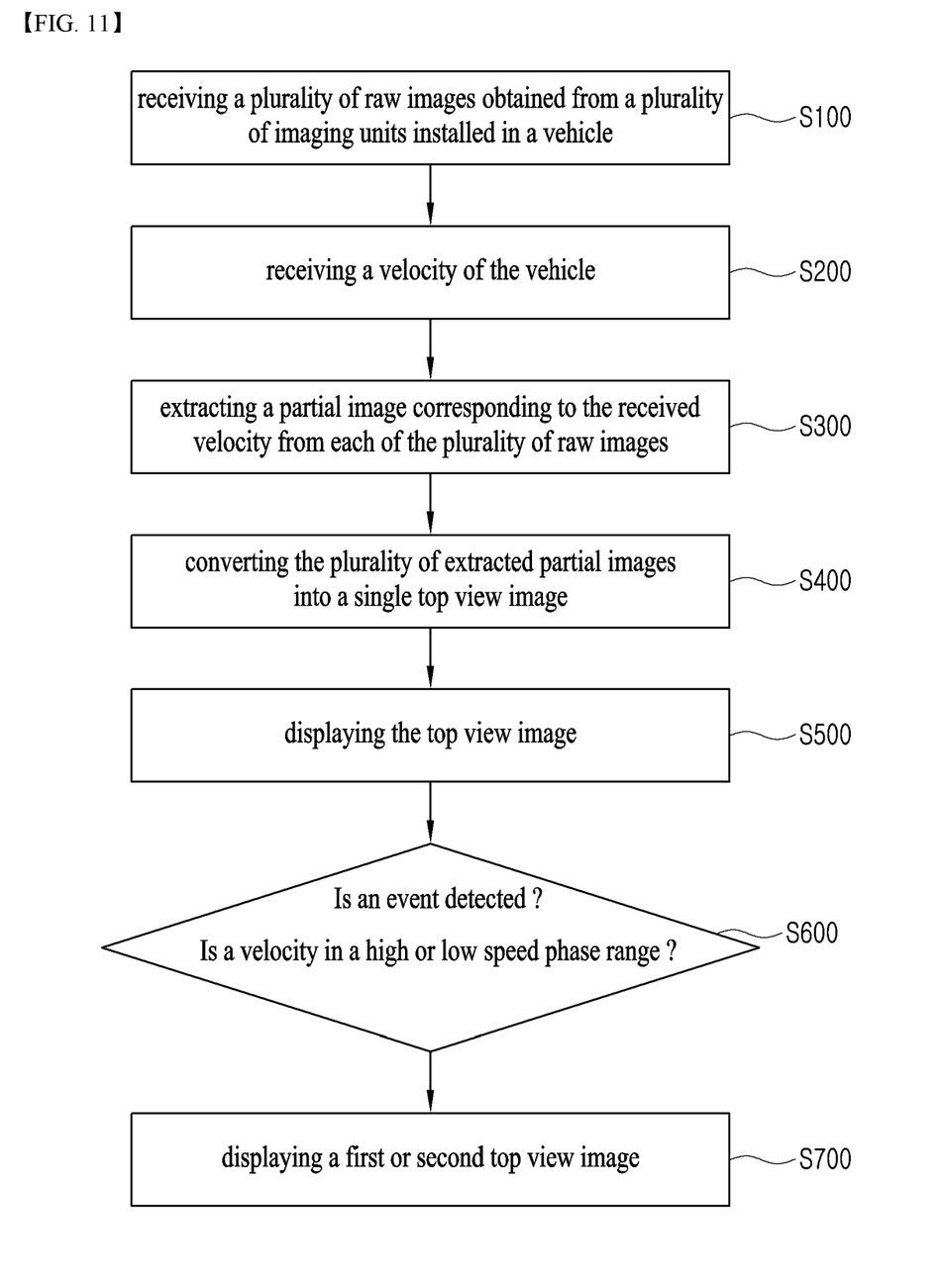
FIG. 11 is a flow chart illustrating a series of operations in a method for processing an image based on a vehicle velocity according to one embodiment of the present disclosure.

FIG. 11 is a flow chart illustrating a series of operations in a method for processing an image based on vehicle velocity, according to one embodiment of the present disclosure.

Referring to FIG. 11, first, the image receiver 310 receives a plurality of raw images obtained from a plurality of imaging units 100 installed at the front, rear, right, and left portions of the vehicle. In addition, the velocity receiver 303 receives the sensed velocity from the velocity sensor S200. Then, the image extraction unit 305 extracts a plurality of images corresponding to different regions according to the velocity from the plurality of raw images in operation S300. More specifically, the velocity may be divided into a parking phase range, a low-speed phase range, and a high-speed phase range. The operations of extracting each of the images may include the operation for extracting images corresponding to the short-distant scenes from the vehicle from the plurality of raw images in the parking phase range, the operation for extracting images corresponding to the middle-distant scenes from the vehicle from the plurality of raw images in the low-speed phase range, and the operation for extracting the images corresponding to the long-distant scenes from the vehicle from the plurality of raw images in the high-speed phase range.

Then, the top view image generation unit 307 converts the plurality of images extracted by the image extraction unit 305 into a top view image S400.

In more detail, the top view image generation unit 307 uses a first lookup table including mapping data indicating a correspondence relationship between a plurality of images extracted at the parking phase range and top view images to generates a first top view image. The top view image generation unit 307 uses a second lookup table including mapping data indicating a correspondence relationship between a plurality of images extracted at the low-speed phase range and top view images to generates a second top view image. The top view image generation unit 307 uses a third lookup table including mapping data indicating a correspondence relationship between a plurality of images extracted at the high speed phase range and top view images to generates a third top view image.

The top view image generated by the top view image generation unit 307 is then displayed on the display 311 at S500.

Then, when a predefined object is detected from the top view image or a sensor (not shown) that detects the movement of the vehicle surround detects the event related data, the event detection unit may determine that an event has occurred S600.

Upon detecting the event, the third top view image displayed on the display when the velocity is in a high-speed phase range may be switched to the first top view image or the second top view image. Upon detecting the event, the second top view image displayed on the display when the velocity is in a low-speed phase range may be switched to the first top view image.

The present disclosure has been illustrated by reference to specific details such as specific elements, etc., and to the limited embodiments and drawings. However, such illustrations are provided only to assist the overall understanding of the present disclosure, and the present disclosure is not limited thereto. It will be apparent to those skilled in the art that various modifications and variations can be made in the present disclosure. Accordingly, the spirit of the present disclosure should not be confined to the illustrated embodiments. It is to be understood that both the appended claims and their equivalents are intended to be included within the scope of the present invention.

The invention claimed is:

1. A device for processing an image based on a vehicle velocity, the device comprising:
   an image receiver for receiving a plurality of raw images from a plurality of imaging units installed in a vehicle;
   a velocity receiver for receiving an information of a velocity of the vehicle;
   an image extraction unit for extracting a partial image corresponding to the velocity from each of the plurality of raw images;
   a top view image generation unit for converting the plurality of extracted partial images into a single top view image; and
   a display for displaying the top view image,
   wherein a range of the velocity is divided into a parking phase range, a low-speed phase range, and a high-speed phase range,
   wherein the image extraction unit is configured to:
      extract a partial image corresponding to a short-distant scene from each of the plurality of the raw images in the parking phase range;
      extract a partial image corresponding to a middle-distant scene from each of the plurality of the raw images in the low-speed phase range; and
      extract a partial image corresponding to a long-distant scene from each of the plurality of the raw images in the high-speed phase range,
   wherein the device further comprises a lookup table storage, wherein the lookup table storage stores therein:
      a first lookup table including mapping data indicating a correspondence relationship between the plurality of partial images extracted in the parking phase range and corresponding top view images;
      a second lookup table including mapping data indicating a correspondence relationship between the plurality of partial images extracted in the low-speed phase range and corresponding top view images; and
      a third lookup table including mapping data indicating a correspondence relationship between the plurality of partial images extracted in the high-speed phase range and corresponding top view images,
   wherein the top view image generation unit is further configured to generate at least one of a first top view image in the parking phase range, a second top view image in the low-speed phase range, and a third top view image in the high-speed phase range, using at least one of the first to third lookup tables.

2. The device of claim 1, wherein the device further comprises:
   an event detection unit for detecting an event occurrence when a predefined object is detected from top view images or a motion in a surrounding of the vehicle is detected by a sensor; and
   a controller for switching a display of a top view image between the first to third top view images when the event detection unit detects the event occurrence,
   wherein when a predefined object is detected from the first top view image or the second top view image or a movement in the surrounding of the vehicle is sensed by the sensor while the velocity is in a high-speed phase range, the controller switches the third top view image being displayed in the display to the first top view image or the second top view image, wherein when a predefined object is detected from the first top view image or a movement in the surrounding of the vehicle is sensed by the sensor while the velocity is in a low-speed phase range, the controller switches the second top view image being displayed in the display to the first top view image.

3. A method for processing an image based on a vehicle velocity, the method comprising:
receiving a plurality of raw images obtained from a plurality of imaging units installed in a vehicle;
receiving an information of a velocity of the vehicle;
extracting a partial image corresponding to the velocity from each of the plurality of raw images;
converting the plurality of extracted partial images into a single top view image; and
displaying the top view image;
wherein a range of the velocity is divided into a parking phase range, a low-speed phase range, and a high-speed phase range,
wherein extracting the partial image corresponding to the velocity from each of the plurality of raw images includes:
extracting a partial image corresponding to a short-distant scene from each of the plurality of the raw images in the parking phase range;
extracting a partial image corresponding to a middle-distant scene from each of the plurality of the raw images in the low-speed phase range; and
extracting a partial image corresponding to a long-distant scene from each of the plurality of the raw images in the high-speed phase range,
wherein converting the plurality of extracted partial images into the single top view image includes
generating a first top view image in the parking phase range using a first lookup table, wherein the first lookup table includes mapping data indicating a correspondence relationship between the plurality of partial images extracted in the parking phase range and corresponding top view images;
generating a second top view image in the low-speed phase range using a second lookup table, wherein the second lookup table includes mapping data indicating a correspondence relationship between the plurality of partial images extracted in the low-speed phase range and corresponding top view images; and/or
generating a third top view image in the high-speed phase range using a third lookup table, wherein the third lookup table includes mapping data indicating a correspondence relationship between the plurality of partial images extracted in the high-speed phase range and corresponding top view images, wherein the method further comprises:
detecting an event occurrence when a predefined object is detected from the top view images or a motion in a surrounding of the vehicle is detected by a sensor;
when a predefined object is detected from the first top view image or the second top view image or a movement in the surrounding of the vehicle is sensed by the sensor while the velocity is in the high-speed phase range, switching the third top view image being displayed in the display to the first top view image or the second top view image; and/or
when a predefined object is detected from the first top view image or a movement in the surrounding of the vehicle is sensed by the sensor while the velocity is in the low-speed phase range, switching the second top view image being displayed in the display to the first top view image.

4. A machine-readable storage medium having instructions therein, wherein when the instructions are executed by a machine, the instructions allow the machine to perform the steps of,
receiving a plurality of raw images obtained from a plurality of imaging units installed in a vehicle;
receiving an information of a velocity of the vehicle;
extracting a partial image corresponding to the velocity from each of the plurality of raw images;
converting the plurality of extracted partial images into a single top view image; and
displaying the top view image,
wherein a range of the velocity is divided into a parking phase range, a low-speed phase range, and a high-speed phase range,
wherein extracting the partial image corresponding to the velocity from each of the plurality of raw images includes:
extracting a partial image corresponding to a short-distant scene from each of the plurality of the raw images in the parking phase range;
extracting a partial image corresponding to a middle-distant scene from each of the plurality of the raw images in the low-speed phase range; and
extracting a partial image corresponding to a long-distant scene from each of the plurality of the raw images in the high-speed phase range,
wherein converting the plurality of extracted partial images into the single top view image includes:
generating a first top view image in the parking phase range using a first lookup table, wherein the first lookup table includes mapping data indicating a correspondence relationship between the plurality of partial images extracted in the parking phase range and corresponding top view images;
generating a second top view image in the low-speed phase range using a second lookup table, wherein the second lookup table includes mapping data indicating a correspondence relationship between the plurality of partial images extracted in the low-speed phase range and corresponding top view images; and/or
generating a third top view image in the high-speed phase range using a third lookup table, wherein the third lookup table includes mapping data indicating a correspondence relationship between the plurality of partial images extracted in the high-speed phase range and corresponding top view images, wherein the method further comprises:
detecting an event occurrence when a predefined object is detected from a top view image or a motion in a surrounding of the vehicle is detected by a sensor;
when a predefined object is detected from the first top view image or the second top view image or a movement in the surrounding of the vehicle is sensed by the sensor while the velocity is in the high-speed phase range, switching the third top view image being displayed in the display to the first top view image or the second top view image; and/or
when a predefined object is detected from the first top view image or a movement in the surrounding of the vehicle is sensed by the sensor while the velocity is in the low-speed phase range, switching the second top view image being displayed in the display to the first top view image.

* * * * *